United States Patent
Johansson

(10) Patent No.: US 8,458,476 B2
(45) Date of Patent: Jun. 4, 2013

(54) WATERMARKING COMPUTER PROGRAM CODE

(75) Inventor: Björn Johansson, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 752 days.

(21) Appl. No.: 11/721,668

(22) PCT Filed: Nov. 24, 2005

(86) PCT No.: PCT/EP2005/012821
§ 371 (c)(1),
(2), (4) Date: Mar. 4, 2008

(87) PCT Pub. No.: WO2006/066699
PCT Pub. Date: Jun. 29, 2006

(65) Prior Publication Data
US 2009/0254752 A1    Oct. 8, 2009

Related U.S. Application Data

(60) Provisional application No. 60/638,859, filed on Dec. 22, 2004.

(30) Foreign Application Priority Data

Nov. 15, 2005    (EP) .................................... 05388097

(51) Int. Cl.
*G06F 21/00* (2006.01)
(52) U.S. Cl.
USPC ............ 713/176; 713/187; 713/189; 726/26; 726/32
(58) Field of Classification Search
USPC ................. 713/176, 187, 189; 726/22, 26, 32
See application file for complete search history.

(56) References Cited

U.S. PATENT DOCUMENTS

| | | | | |
|---|---|---|---|---|
| 7,430,670 | B1 * | 9/2008 | Horning et al. | 713/190 |
| 7,757,097 | B2 * | 7/2010 | Atallah et al. | 713/187 |
| 7,770,016 | B2 * | 8/2010 | Horne et al. | 713/176 |
| 2003/0221116 | A1 * | 11/2003 | Futoransky et al. | 713/189 |
| 2005/0055312 | A1 * | 3/2005 | Wilson et al. | 705/51 |
| 2005/0262347 | A1 * | 11/2005 | Sato et al. | 713/176 |
| 2005/0262490 | A1 * | 11/2005 | Thomborson et al. | 717/145 |

FOREIGN PATENT DOCUMENTS

| | | |
|---|---|---|
| WO | WO 99/01815 A | 1/1999 |
| WO | WO 02/06925 A | 1/2002 |

OTHER PUBLICATIONS

C. Collberg, et al., XP-009084970 "Dynamic Path-Based Software Watermarking" Department of Computer Science University of Arizona, Tucson. AZ 85721, Jun. 9-11, 2004.

* cited by examiner

*Primary Examiner* — Brandon Hoffman
*Assistant Examiner* — Thomas C Lauzon

(57) ABSTRACT

A method of embedding information in a computer program code, including a plurality of program statements. The method comprises: inserting a conditional program statement in the computer program code, the conditional program statement including a condition and a plurality of alternative program statements, the conditional program statement being adapted to cause a data processing system to evaluate said condition and, responsive to a result of said evaluating step, to selectively execute one of said plurality of alternative program statements; wherein said condition is indicative of at least a part of said information; and wherein the plurality of alternative program statements are adapted to cause the computer program code to produce the same program output irrespective of which of said alternative program statements is executed.

19 Claims, 5 Drawing Sheets

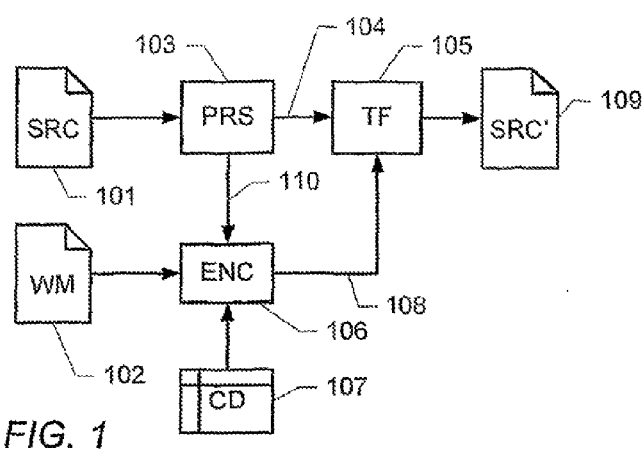
FIG. 1
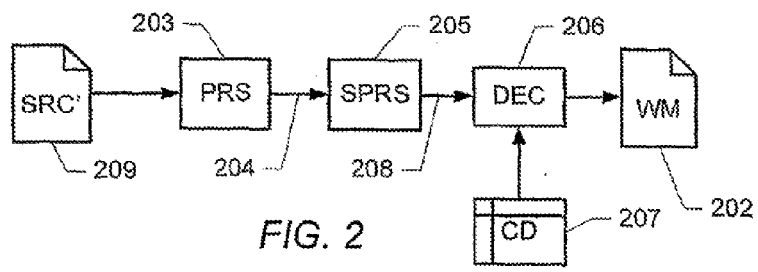
FIG. 2
| CW₁ | C₁₁ | C₁₂ | ... | C₁K |
| CW₂ | C₂₁ | C₂₂ | ... | C₂K |
| ... | ... | ... | ... | ... |
| CWₙ | C₁ₙ | C₂ₙ | ... | Cₙₖ |
FIG. 3

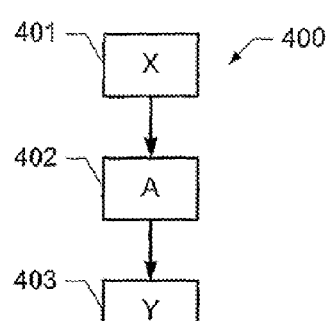
*FIG. 4a*
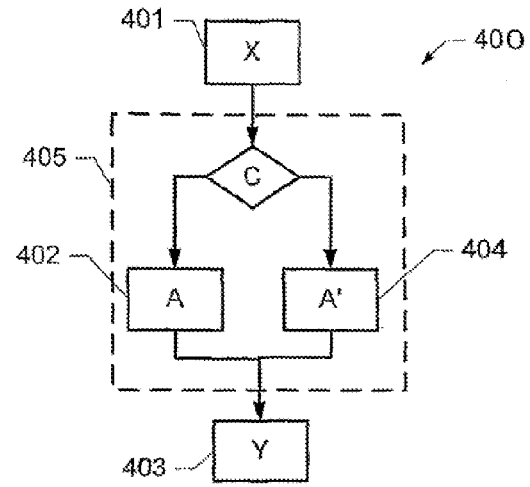
*FIG. 4b*
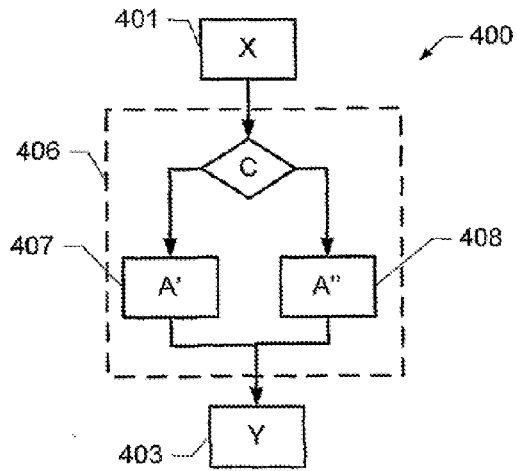
*FIG. 4c*
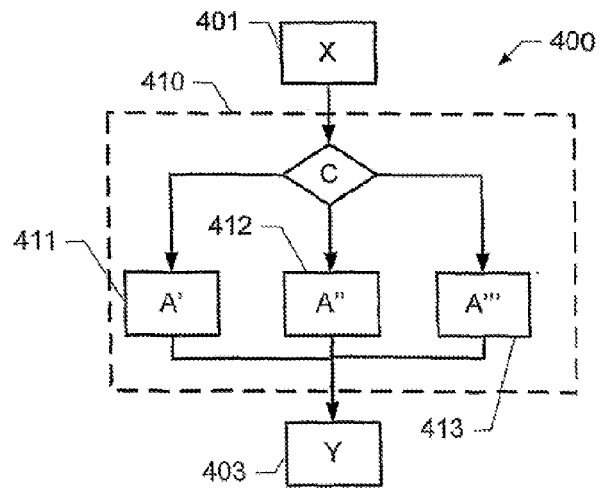
*FIG. 4d*
*FIG. 4*

```
NbrOfEven=O
while (z<1O){
        If (z%2==0)
502         NbrOfEven++;
        z++
}
```

*FIG. 5a*

```
NbrOfEven=O
while ((x+y)<1O){
        If ((x+y)%2==0)
                NbrOfEven++;
        If ((x^2-y^2)<10)              509
506             x++;                   507
        else
                y++;                   508
}
```

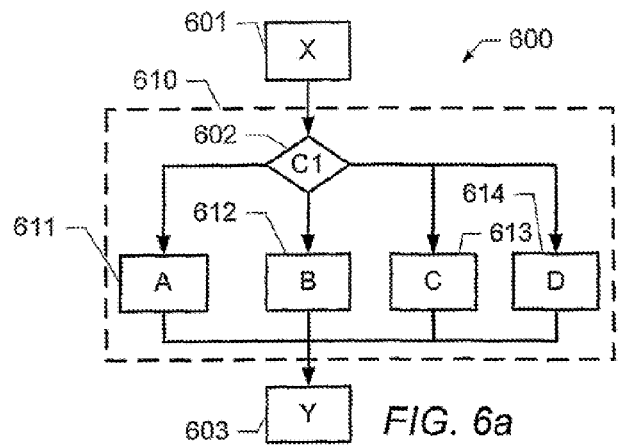
*FIG. 6a*
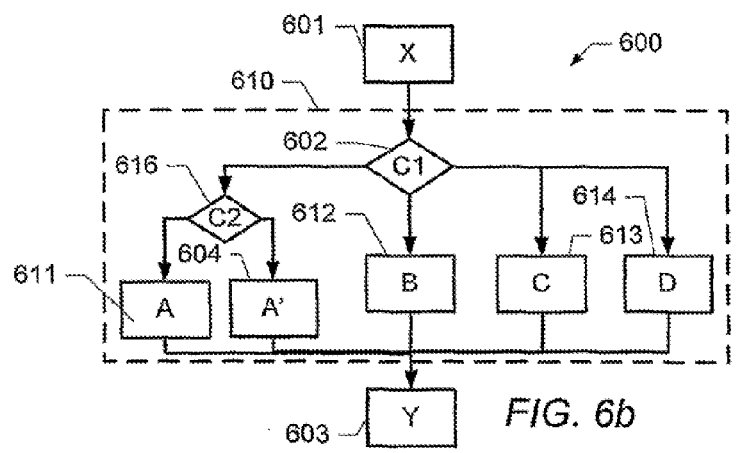
*FIG. 6b*
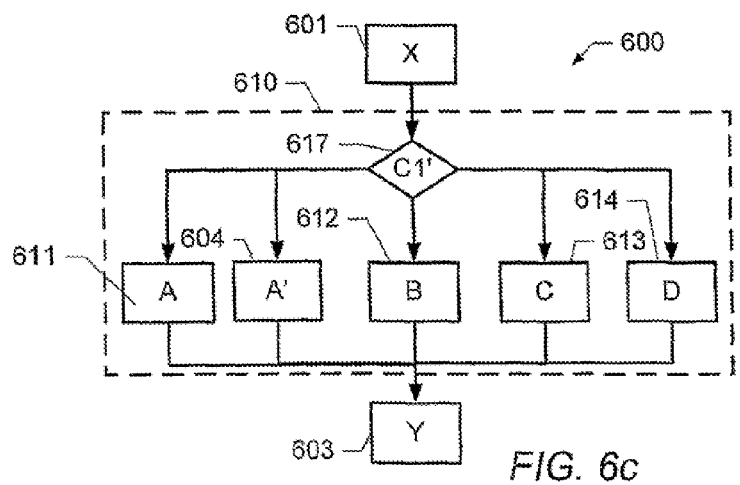
*FIG. 6c*
*FIG. 6*

WATERMARKING COMPUTER PROGRAM CODE

This application claims the benefit of U.S. Provisional Application No. 60/638,859, filed Dec. 22, 2004, the disclosure of which is fully incorporated herein by reference.

FIELD OF THE INVENTION

The invention relates to the embedding and detection of information, in particular a digital watermark, in computer program code, e.g. source code or object code.

BACKGROUND OF THE INVENTION

It is generally desirable for the manufacturer and/or distributor of software to control the distribution of such software, in particular to be able to protect software against theft, establish/prove ownership of the software, validate software and/or identify/trace copies of distributed software. Hence, efficient techniques for watermarking of computer software, in particular of source code or object code are desirable. The purpose of such watermarking techniques is to add information—a watermark or simply a mark—in the software, e.g. by manipulating/altering or adding program code. The information may be used as a copyright notice, for identification purposes, e.g. to identify the buyer of the software, or the like. It is generally desirable that the information is embedded in such a way that this information cannot be removed by the buyer but that it can be extracted from the software using knowledge about the process that put the mark into the software. In particularly, a watermark is said to be stealthy if the watermark is not easily detectable (e.g. by statistical analysis). A watermark is said to be resilient, if it is able to survive semantic-preserving transformations such as code obfuscation or code optimization, and/or able to survive collision attacks.

In general, a watermark may be subject to different attacks in order to render the mark unrecognisable. Examples of kinds of attacks include:
  Additive attacks: New watermarks are added to the code so that the original mark no longer can be extracted, or, to make it impossible to determine which is the original mark.
  Distortive attacks: The code is subjected to semantic-preserving transformations such as code obfuscation and code optimization in hope that the watermark will be distorted and not able to be recognized.
  Subtractive attacks: The location of the watermark is determined and the mark is cropped out of the program.
  Collusion attacks: Different marked programs are used to determine the location of the mark.

Thus, it is a general problem to provide watermarking techniques that yield markings that are robust under such attacks, e.g. by the buyer of the software.

When the embedded watermark is detectable, it can be removed (cropped out) from the program or be replaced by an equivalent expression, which very likely destroys the original mark. In existing solutions embeddings are often relatively easy too identify and thus can be cropped out.

The article "Watermarking, tamper-Proofing, and Obfuscation—Tools for software Protection", by Christian Collberg et al., IEEE Transact. On softw. Eng., Vol. 28, No. 8, p. 735-746 describes watermarking of program code.

Obfuscation is a technique used to complicate code, i.e. to transform the program code into one that has the same observable behaviour but for which the program code is more difficult to understand. The technique is used in order to make software harder to reverse engineer. It typically involves renaming, reordering, spitting/merging, loop transformations, etc. Hence, obfuscation makes code harder to understand when it is de-compiled, but it typically has no effect on the functionality of the code. U.S. Pat. No. 6,668,325 discloses a number of code obfuscation techniques, that may be used in a watermarking context.

However, even though the above prior art methods provide a watermarking of computer program code, it remains a problem to provide a watermarking technique that results in watermarks that are more difficult to detect when studying the marked software.

In particular the embedding of watermarks by simple obfuscating changes in the program code, e.g. by renaming of variables, reordering of instructions, loop transformations, etc. involve the problem that they are not sufficiently resilient, since obfuscation techniques typically change exactly these properties, thereby rendering the watermark vulnerable towards an obfuscating attack.

Furthermore, it remains a problem to provide a watermarking technique that allows a robust way of Identifying the origin of a specific copy of the software.

SUMMARY OF THE INVENTION

The above and other problems are solved by a method of embedding information in a computer program code, the computer program code comprising a plurality of program statements and being adapted to cause, when executed by a data processing system, the data processing system to produce a program output, the method comprising: inserting a conditional program statement in the computer program code, the conditional program statement including a condition and a plurality of alternative program statements, the conditional program statement being adapted to cause a data processing system to evaluate said condition and, responsive to a result of said evaluating step, to selectively execute one of said plurality of alternative program statements; wherein said condition is indicative of at least a part of said information; and wherein the plurality of alternative program statements are adapted to cause the computer program code to produce the same program output irrespective of which of said alternative program statements is executed.

It is an advantage of the method described herein that it provides stealthy, resilient marks with a reasonable overhead.

In particular, in an additive attack other conditional statements are inserted into the code. However, the original conditional statement that includes the watermark information is located in a position in the code that is known only to the inserter/extractor. A conditional statement located at a different position will consequently not confuse the extractor. Furthermore, conditional statements preceded by a condition statement that cannot be successfully decoded into information, e.g. a condition that has no corresponding entry in a list of code words, will not be regarded as a watermarking statement.

It is a further advantage that the method described herein provides an increased protection against an attacker who, in order to disguise the origin of an unauthorised copy, obfuscates the code into a new copy as to prevent the owner of the software from identifying the obfuscated copy.

It is a further advantage of the method described herein that it is resilient against most automatic attacks such as obfuscation, optimisation, and decompilation/recompilation.

It is a further advantage of the method described herein that it does not add any significant overhead, i.e. does not significantly increase the size and/or execution time of the watermarked program code. The increase in execution time is only due to the evaluation of the inserted condition. The increase in size corresponds to the size of the inserted conditional program code statement. For a typical software application, these effects are small compared to the size of the entire code.

The term "program statement" as used herein is intended to include a unit of structuring a programming language, in particular a minimal unit of such structuring. Examples of kinds of statements include definitions, declarations, assignments, conditional statements, loops, and function/procedure calls.

The term "condition" as used herein is intended to include an expression in a programming language that is adapted to produce and return a result, i.e. a value. In a conditional program statement, the program flow continues at one of a number of alternative program statements depending on which value the condition is evaluated to. For example, a condition may be a Boolean expression that evaluates to TRUE or FALSE. Typically, such conditions are evaluated in an IF . . . THEN conditional program statement and before each loop iteration of a loop; the loop exits when the condition evaluates to false. Other examples of conditional statements include "switch" statements which test a control expression for equality. The switch statement is followed by a number of "case" clauses that each specify one possible test value and that each have a program statement associated with it; the program statement of a case clause is executed when the control expression satisfies its corresponding test value.

The term "expression" in a programming language as used herein is intended to include a combination of values, variables, functions, etc., wherein the combination is interpreted according to the particular rules of precedence and of association for a particular programming language, which combination is adapted to produce and return a result, i.e. a value. An algebraic expression produces a numeric result, i.e. a result having a numeric data type, e.g. a floating point data type or an integer data type.

The term "program output" as used herein is intended to include any observable behaviour during execution of the program, e.g. any program behaviour that is observable/noticeable by a user, by another computer program, by another device, or the like. Examples of program output include the output of numeric values, text output, binary output, output signals, visual, e.g. graphical, output, audible output, etc. that may be output via any suitable output device such as a computer screen, printer, storage medium, communications interface, etc., via a data interface, or the like. In particular, when the alternative program statements correspond to non-identical program behaviour such that the differences in program behaviour are non-observable during execution of the program, it becomes more difficult for an attacker to identify the watermark.

When the method further comprises obfuscating at least one of the plurality of alternative program statements, e.g. by any suitable code obfuscation technique known as such in the art, the embedded information becomes more stealthy. In particular, in order to perform a subtractive attack an attacker would have to realise that the alternative program statements result in the same program behaviour and then change/remove the condition. Obfuscating one or more of the alternative program statements provides alternative statements such that it becomes computationally hard to realise that two alternative statements result in the same program behaviour.

In one embodiment each of the alternative program statements is adapted to update one or more program objects, e.g. variable(s), data structure(s), etc.; and the program output depends on said program objects only by means of one or more predetermined functions of said program objects, wherein each of said one or more functions produces a result that is independent of which one of said alternative program statements is executed. Hence, such a set of alternative instructions can easily be implemented and provides a stealthy watermark.

When the method further comprises encoding the information to be embedded as one or more code words, each code word corresponding to one or more respective predetermined condition(s), an efficient encoding scheme for embedding a large variety of additional information is provided.

When encoding the information comprises encoding the information using an error correcting code, the resilience of the embedded information is further increased.

The present invention relates to different aspects including the method described above and in the following, corresponding devices, and computer programs, each yielding one or more of the benefits and advantages described in connection with the above-mentioned methods, and each having one or more embodiments corresponding to the embodiments described in connection with the above-mentioned methods.

In particular, a method of detecting information embedded in a computer program code, the computer program code comprising a plurality of program statements and being adapted to cause, when executed by a data processing system, the data processing system to produce a program output, comprises:

parsing the computer program code as to identify at least one conditional program statement, the conditional program statement including a condition and a plurality of alternative program statements, the conditional program statement being adapted to cause a data processing system to evaluate said condition and, responsive to a result of said evaluating step, to selectively execute one of said plurality of alternative program statements; wherein the plurality of alternative program statements are adapted to cause the computer program code to produce the same program output irrespective of which of said alternative program statements is executed;

extracting at least a part of said embedded information from the condition.

It is noted that the features of the methods described above and in the following may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. In particular, in some embodiments, the computer program code into which information is to be embedded or in which embedded information is to be detected is loaded into a memory of a computer, and the steps of the method of embedding or detecting information described herein are automatically performed by said computer.

For example, the program code means may be loaded in a memory, such as a RAM (Random Access Memory), from a storage medium or from another computer via a computer network. Alternatively, the described features may be implemented by hardwired circuitry instead of software or in combination with software.

According to one aspect, a data processing system is suitably configured to perform the steps of the method described above and in the following.

According to another aspect, a computer program product comprises computer-executable instructions adapted to cause, when executed on a data processing system, the data processing system to perform the method described above and in the following.

In some embodiments, the tangible and non-transitory computer program product is embodied as a tangible and non-transitory computer-readable medium having stored thereon the computer-executable instructions. For example, the computer-readable medium may be a compact disc (CD), an optical disc, a diskette, a magnetic storage medium, a memory stick, or the like, that has stored thereon the computer-executable instructions. For example, the tangible and non-transitory computer-readable medium may have stored thereon a software application for embedding a watermark and a software application for detecting a watermark in the program code. The software applications may be embodied as separate applications or combined in a single application. In other embodiments, the computer program product is embodied as a data signal, e.g. a suitably modulated carrier signal. For example, the computer-executable instructions may be provided for download from a server computer via a computer network.

In some embodiments, the computer program product comprises a software compiler comprising functionality adapted to cause the data processing system to perform the method described above and in the following as one of a number of compilation passes performed by the compiler. Hence, an integrated software tool for compilation and watermark embedding is provided. Furthermore, since the watermark embedding described herein involves some of the same code analysis techniques for analysing source code as conventional compilers use, the corresponding software functionality may be reused, thereby providing an efficient software implementation.

In yet another aspect, a computer program includes embedded information, embedded therein by the method described herein. In some embodiments, the computer program is embodied as a computer-readable medium having stored thereon the computer program. In other embodiments, the computer program is embodied as a data signal, e.g. a suitably modulated carrier signal.

For the purpose of the present description, the terms storage means and computer-readable medium are intended to comprise any suitable storage medium, device or circuit, e.g. a read-only-memory (ROM), a random access memory (RAM), a flash memory, an Erasable Programmable Read-Only Memory (EPROM), volatile or non-volatile memory, an optical storage device, a magnetic storage device, a diskette, a CD, a hard disk, or the like.

BRIEF DESCRIPTION OF THE DRAWINGS

The above and other aspects will be apparent and elucidated from the embodiments described in the following with reference to the drawing in which:

FIG. 1 shows a schematic block diagram of a watermark embedding process.

FIG. 2 shows a schematic block diagram of a watermark extraction process.

FIG. 3 illustrates a table that relates codewords for encoding a watermark with respective mathematical transformations.

FIG. 4 schematically illustrates examples of the insertion of a conditional statement.

FIG. 5 illustrates examples of a code fragment to be watermarked and of a corresponding watermarked code fragment.

FIG. 6 schematically illustrates examples of the insertion of a conditional statement.

DETAILED DESCRIPTION OF PREFERRED EMBODIMENTS

Figure 7:
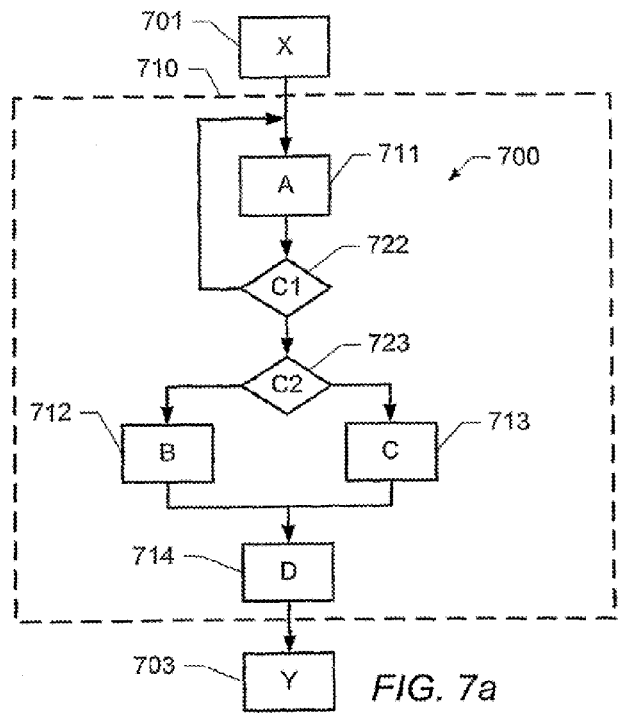
FIG. 7 schematically illustrates an example of a modification of a control flow of a computer program as to facilitate the insertion of a conditional statement.
Figure 7:
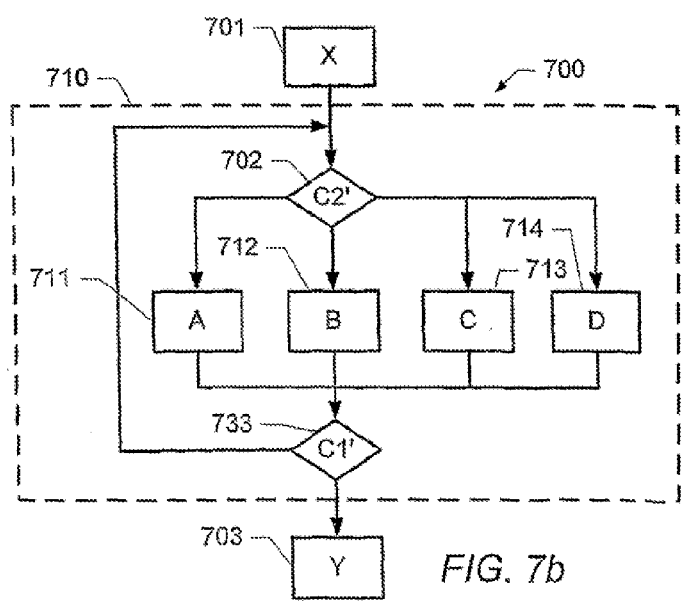

FIG. 1 shows a schematic block diagram of a watermark embedding process. The process receives a source code 101 and a digital watermark 102 to be embedded in the source code.

The source code 101 is typically in the form in which a computer program has been written by a programmer, typically in a formal programming language such as C, C++, Java, or the like. The source code can be automatically compiled by a compiler into object code or machine code or executed by an interpreter.

The source code 101 may be represented as one or more text documents or as any other suitable digital representation. Alternatively, the watermarking process may receive a different type of input code in which program statements can be identified, e.g. object code.

The digital watermark 102 may be any suitable digital representation of the watermark information to be embedded, e.g. information identifying the recipient of the source code, the author of the source code, an identifier identifying the source code, a digital certificate, a pseudo-random number, a secret key, and/or any other suitable information. For example, the watermark may be represented as a bit sequence.

The source code is fed into a parser module 103. The parser module parses the source code and identifies suitable program statements or other suitable locations in the source code that may be used for the insertion of a conditional program statement as described herein. For example, the identified program statements may be program statements that are particularly suitable as an input to a code obfuscation technique. Examples of suitable locations will be illustrated below with reference to FIGS. 6 and 7. The parser module may use any suitable technique for parsing a source code known in the art, for example a subset of the techniques used by conventional compilers when parsing source code as to identify the structural components of the corresponding programming language, such as variable definitions, constant definitions, functions, program statements, conditions, loops, assignments, expressions, etc. From all the program statements/locations identified in the source code, the parser may further select a predetermined subset of suitable statements/locations. The parser module forwards the identified statements/locations 104, or at least pointers to their respective locations in the source code, to a code transformation module 105. Optionally, the parser module may store the identified locations in a repository, e.g. in relation to information about the recipient of the program code, the watermark to be embedded, a copy of the original program code, and/or the like.

The digital watermark 102 is fed into an encoder module 106. The encoder module encodes the digital watermark according to a predetermined code. For example, the code 107 may comprise a set of code words such that each code word is represented by a specific condition, e.g. by a specific test for equality or inequality. When the code 107 is an error correcting code, a code with a certain degree of redundancy, or the like, the subsequent detection of the embedded watermark becomes more reliable. Optionally the encoder module further receives information 110 from the parser module 103, e.g. information about the number of suitable statements/locations detected. In some embodiments, this information allows the encoder to adapt the encoding to the number of statements/locations identified. For example, the level of redundancy used in the encoding may be controlled based on the number of suitable statements/locations found. The more suitable statements/locations are identified, the higher the redundancy that may be included in the encoded watermark. Alternatively or additionally, the encoder module may send control information to the parser module, e.g. as to instruct the parser module to identify a certain minimum number of suitable statements/locations. For example, the encoder module may determine such minimum number based on a desired redundancy level and/or the size of the watermark and/or other parameters.

In some embodiments, each codeword has associated with it a plurality of alternative conditions each being indicative of the corresponding codeword, and the encoder may select one of the alternative conditions, e.g. randomly, based on the type of identified statement, based on a previous selection, and/or the like.

FIG. 3 illustrates a data structure that relates code words for encoding a watermark with respective conditions. In the example of FIG. 3, the relation between code words and conditions are stored in a data structure representing a code book. In particular, in this example, the code book is represented by a list of 1-dimensional arrays, generally designated 300. Each entry, i.e. each array, in the list 300 corresponds to one of the code words, designated $CW_1, CW_2, \ldots, CW_N$, of the code used for encoding the watermark. Each cell in each of the arrays identifies a specific condition, designated $C_{11}, C_{12}, C_{13}, \ldots, C_{NK}$, to be used for a particular code word.

For example, a condition may be a comparison of a specific polynomial expression or other function with zero, another condition may be a specific inequality test, or the like. Furthermore, for each type of condition, there may be one or more sub-types, e.g. conditions involving polynomials in one variable, polynomials in two variables, conditions including an equality, conditions including an inequality, etc. Alternatively or additionally, the types of expression may be further subdivided according to any additional information that the parser may detect in the program code, e.g. limitations on the variable(s) to be involved in the expression, e.g. that the variables only may assume positive values, etc. Hence, for a given code word, the encoder process may select one of a number of possible conditions, e.g. a different condition for each time a code word occurs, a condition in one or two variables depending on the identified program statement at which the condition is to be inserted, etc.

It is understood that the above subtypes of expressions and/or additional information may alternatively be implemented as input parameters to a respective function that generates a specific condition. For example, each cell of list 300 may include a pointer to such a function, and further input parameters may include variable names to be used in the condition and/or the like. In yet another embodiment the list 300 may be represented as a higher dimensional array, e.g. a 2- or 3-dimensional array with indexes determined by the code word, the condition type, and, optionally, by additional information.

It is further understood that the watermark may be encoded by any other suitable code, e.g. codes that are not based on a code book such as codes based on rule-based encoding.

Again referring to FIG. 1, the encoded watermark 108 generated by the encoder module 106, e.g. a sequence of conditions, a sequence of conditional statements, or the like, is fed into the transformation module 105.

The transformation module 105 receives the identified program statements/locations 104 from the parser module 103 and the encoded watermark 108 from the encoder module 106. The transformation module then inserts respective conditional statements including the respective conditions according to the received encoded watermark. Examples of such conditional statements will be described in greater detail below. The conditional expressions are inserted in the source code, e.g. instead of the original identified statements, thus resulting in a watermarked source code 109. The watermarked source code may subsequently be further processed, e.g. compiled, compressed, encoded, and/or the like.

FIG. 2 shows a schematic block diagram of a watermark detection/extraction process. The watermark extraction process receives a watermarked source code 209, or another type of watermarked input code as described above. The watermarked source code 209 is fed into a parser module 203 similar to the parser module 103 of the watermark embedding process described above. The parser module 203 identifies all potential candidate conditional statements. For example, the parser module may identify all conditional statements that include a condition which appears in a code data structure 207 that includes all possible conditions used by the code, e.g. a data structure as described in connection with FIG. 3. Alternatively, the parser module may further receive the original, i.e. unmarked, program code and identify all conditional statements that are not present in the unmarked code. As yet another example, the parser module may further receive a list of locations in the program code at which conditional statements including watermark information occur. Such a list may, for example be stored during the embedding process and stored in a watermark repository. Hence, the stored locations of the conditional statements for a particular customer may be retrieved, thereby reducing the computational effort for identifying the conditional statement(s) that encode the watermark information, e.g. by means of a debugger. The identified candidate conditional statements 204 are fed into a statement parsing module 205. The statement parsing module parses each of the identified conditional statements as to identify the respective conditions used in the identified conditional statements. The statement parsing module 205 thus generates a sequence of identified conditions 208 which is fed into a decoder module 206.

The decoder module 206 receives the sequence of identified conditions 208 and decodes the sequence based on the known code 207 that was used in the embedding process. When the decoding further comprises error detection or even error correction, the detection reliability is improved. The decoder thus generates a decoded watermark 202. In some embodiments, the decoded watermark is subsequently compared to a reference watermark or a list of reference watermarks in order to identify the embedded information.

FIG. 4 schematically illustrates examples of the insertion of a conditional statement.

In particular, FIG. 4a illustrates the program flow of a fragment of the original source code to be watermarked. The fragment, generally designated 400, includes a sequence of three program statements X, A, and Y, designated 401, 402, and 403, respectively. In the original program flow, the statements X, A, and Y are executed in this order. It will be appreciated that each of the statements X, A, and Y may include a single statement or a plurality of individual statements.

FIG. 4b illustrates an example of the program flow of the corresponding watermarked code fragment. In this example, the program statement A has been "cloned", i.e. a further, alternative program statement A', designated 404, was added, where A' results in the same program behaviour as A, but uses a different implementation. For example, A' may be generated from A by any suitable code obfuscation technique known as such, for example the techniques described in U.S. Pat. No. 6,668,325 and "A taxonomy of obfuscating transformations," Technical Report 148, University of Auckland, 1997. The program statement A is thus replaced by a conditional statement 405 that may be expressed as "if C then A else A'", where C is the condition that determines whether A or A' is to be executed. The condition C contains information about the watermark. As described above, the condition may be selected from a private code book or by means of any other suitable encoding scheme. Since the alternative statements A and A' are generated as to be equivalent, i.e. to result in the same program output and overall same program behaviour, it does not matter whether the condition C is true or not.

FIG. 4c illustrates another example of the program flow of the corresponding watermarked code fragment. This example illustrates a more general approach, wherein the original statement A is replaced by a branch 406 with condition C and alternative statements A' and A", designated 407 and 408. In this example, both alternative statements A' and A" are derived from the original statement A.

For example, A' and A" may be derived from A by two different obfuscation processes, e.g. such that A' and A" have identical behaviour, i.e. such that the program behaviour outside the conditional statement 406 is independent of which of the statements A' and A" is executed.

Alternatively, the statements A' and A" may be generated such that they do not necessarily have identical behaviour but such that it does not matter for the overall program behaviour, in particular for the program output, whether A' or A" is executed. In the following this will be illustrated with reference to FIG. 5 by means of an example, in which a variable is replaced by two auxiliary variables, each of which is updated in a respective one of the alternative statements. However, outside the conditional statements, the program behaviour only depends on a predetermined function of the two variables such that it does not matter which of the two variables is updated within the conditional statement, i.e. which of the alternative statements is executed.

In particular, FIG. 5 illustrates an example of a code fragment to be watermarked.

FIG. 5a shows a code fragment to be watermarked. In particular, the code fragment implements a function that counts the even numbers between 0 and 10. The code fragment includes a statement "z++", designated 502, that increments a counter variable z. The variable z in the code fragment is used to count from 0 to 10 and to test each number whether it is dividable by 2.

FIG. 5b shows the corresponding watermarked code fragment, in which the statement "z++" is replaced by a conditional statement 506. The conditional statement includes two alternative statements 507 and 508, one of which statement (507) increments a new auxiliary variable x, while the other statement (508) increments a second new auxiliary variable y. In all statements of the remaining code in which the variable z is updated after its initialisation or in which the value of z is evaluated, the variable z is replaced by the sum (x+y), i.e. a function of x and y that results in the same value irrespective of whether x or y is incremented. The conditional statement 506 further includes a condition C, designated 509, which encodes at least a part of the watermark. Since the program behaviour does not depend on which of the statements 507 and 508 is executed, it does not matter for the program flow, whether the introduced condition is true or false. In particular, the program output (here the number/count "NbrOfEven" of even numbers) does not depend on which alternative statement is executed.

Hence, the above is an example of a construction that is created by letting A' and A" update an object (in the above example, the tuple (x,y)) differently, but where the program behaviour is dependent on a function of the object only, thus yielding the same result if either A' or A" has been performed. Such constructions make the resulting embedded marks even stealthier.

Again referring to FIG. 4, FIG. 4d illustrates yet another example of the program flow of the corresponding watermarked code fragment. In this example, the original statement is replaced by a conditional statement in the form of a "switch" statement 410 including a condition C. For example, the condition C may be expressed as a control expression that is evaluated during program execution to arrive at a test value. Depending on the test value, the program flow continues at one of a plurality of alternative statements. In the example of FIG. 4d, the switch statement 410 includes three alternative statements 411, 412, and 413. However, it will be appreciated that the switch statement may include any number of alternative statements. To this end, the switch statement is followed by a plurality of "case" clauses 411, 412, 413, wherein each case clause is associated with a possible test value. Hence, during execution, the statement(s) associated with the case clause that satisfies the test value of the control expression is/are executed.

A possible attack against a watermark inserted according to the method described herein is to remove the inserted alternative program statement and the condition that encodes the watermark. The risk of such an attack being successful may be reduced by suitably selecting the location for the insertion of an alternative statement. For example, when the conditional statement is inserted into an existing conditional statement resulting in a modified conditional statement, e.g. such that the inserted alternative statement(s) is/are inserted as alternative statement(s) to existing alternative statements of said existing conditional statement, the modified conditional statement cannot simply be removed by an attacker without changing the functionality of the code. An example, of such a modification is illustrated in FIG. 6.

FIG. 6 schematically illustrates examples of the insertion of a conditional statement. In particular, FIG. 6a illustrates the program flow of a fragment of the original source code to be watermarked. The fragment, generally designated 600, includes a sequence of three program statements designated 601, 610, and 603, respectively. Statement 610 is a conditional statement including condition C1, designated 602, and alternative statements A, B, C, and D, designated 611, 612, 613, and 614, respectively, such that the condition C1 determines which of the alternative statements is executed.

FIG. 6b illustrates an example of the program flow of the corresponding watermarked code fragment. In this example, the conditional statement 610 is modified such that one of the alternative statements, namely program statement A, has been "cloned", i.e. a further, alternative program statement A', designated 604, was added, where A' results in the same program behaviour as A, but uses a different implementation, as described herein. The program statement A is thus replaced by a conditional statement that may be expressed as "if C2 then A else A'", where C2 (616) is the condition that determines whether A or A' is to be executed. The condition C2 contains information about the watermark. As described above, the condition may be selected from a private code book or by means of any other suitable encoding scheme. Since the alternative statements A and A' are generated as to be equivalent, i.e. to result in the same program output and overall same program behaviour, it does not matter whether the condition C2 is true or not.

FIG. 6c illustrates another example of the program flow of the corresponding watermarked code fragment. The example of FIG. 6c is identical with the example of FIG. 6b, except that in the example of FIG. 6c, the conditions C1 and C2 have been combined to a combined condition C1', designated 617, thereby making it difficult for an attacker to remove the inserted alternative statement A' and the condition C2.

It is noted that other control flows may be brought into the form of FIG. 6a, thereby increasing the number of well-suited locations for the insertion of a watermark. FIG. 7 schematically illustrates an example of a modification of a control flow of a computer program as to facilitate the insertion of a conditional statement.

FIG. 7a illustrates the program flow of a fragment of the original source code to be watermarked. The fragment, generally designated 700, includes a sequence of three program statements designated 701, 710, and 703, respectively. Statement 710 includes a statement A, designated 711, which is repeated one or more times dependant on condition C1, designated 722. Subsequent to statement A, the code fragment 700 includes a conditional statement with two alternative statements B and C, designated 712 and 713, respectively, and a condition C2, designated 723, that determines whether statement C or D is executed. Subsequent to this conditional statement, the code fragment 700 includes a statement D, designated 714, followed by statement 703.

FIG. 7b illustrates the result of a modification of the control flow of FIG. 7a, where the modified control flow includes a conditional statement with four alternative statements 711, 712, 713, 714 and a corresponding condition C2', designated 702. The conditional statement is repeated once or several times dependant on the condition C1' (733). It is understood that conditions C1' and C2' are modified based on the original conditions C1 and C2 as to ensure that repetitions of the conditional statement only statement A may be executed in accordance with the original flow of FIG. 7a.

Consequently, the modified control flow now includes a conditional statement of the form illustrated in FIG. 6a, thus allowing an insertion of a watermark as described in connection with FIG. 6.

Hence, in the above, embodiments of a watermark technique have been disclosed wherein a watermark is embedded in the condition for a branch statement inserted in the code. The statements of each of the branches are adapted to be equivalent so it does not matter how the condition is evaluated, i.e. which one of the branch statements is executed. In order to make it hard to realise that the branch statements are equivalent, they may be obfuscated.

The methods described herein provide a watermarking process that generates watermarks that are difficult to remove by automatic tools such as obfuscation and code optimization. Furthermore, it would require a prohibitive effort to manually analyse the code and substitute back the original expressions.

Although some embodiments have been described and shown in detail, the invention is not restricted to them, but may also be embodied in other ways within the scope of the subject matter defined in the following claims.

In particular, the embodiments have mainly been described in connection with embedding a digital watermark. However, it is understood that the methods described herein may equally be applied to the embedding of any other type of information.

The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A computer-implemented method of embedding information in a computer program code, the computer program code comprising a plurality of program statements and being adapted to cause, when executed by a processor in a data processing system, the data processing system to produce a program output, the method comprising:
   inserting one or more conditional program statements in the computer program code, each conditional program statement including a respective condition and a plurality of alternative program statements, each conditional program statement being adapted to cause a data processing system to evaluate said condition and, responsive to a result of said evaluating step, to selectively execute one of said plurality of alternative program statements,
   wherein said condition is indicative of at least a part of said information;
   wherein said information is encoded as one or more code words, each code word corresponding to one or more predetermined conditions;
   wherein the plurality of alternative program statements are adapted to cause the computer program code to produce the same program output irrespective of which of said alternative program statements is executed; and
   wherein a digital watermark is embedded in said one or more conditions, such that the watermark is directly read from the computer program code by a machine without executing the code.

2. The method according to claim 1, further comprising obfuscating at least one of the plurality of alternative program statements.

3. A method according to claim 1, wherein each of the alternative program statements is adapted to update one or more program objects and wherein the program output depends on said program objects only by means of one or more predetermined functions of said program objects, wherein each of said one or more functions produces a result that is independent of which one of said alternative program statements is executed.

4. The method according to claim 1, wherein encoding the information comprises encoding the information using an error correcting code.

5. The method according to claim 1, wherein said information comprises the digital watermark.

6. The method according to claim 1, wherein the computer program code comprises at least one of source code and object code.

7. The method according to claim 1, further comprising loading the computer program code into a memory of a computer.

8. A data processing system comprising a memory and a processor, the processor suitably configured to perform the steps of the method according to claim 1.

9. A tangible and non-transitory computer program product comprising computer-executable instructions adapted to cause, when executed on a data processing system, the data processing system to perform the method according to claim 1.

10. A computer program product according to claim 9, comprising a computer-readable medium having stored thereon the computer-executable instructions.

11. A tangible and non-transitory computer program product comprising a software compiler having functionality adapted to cause a data processing system to perform the method according to claim 1 as one of a number of compilation passes performed by the compiler.

12. A computer-implemented method of detecting information embedded in a computer program code, the computer program code comprising a plurality of program statements and being adapted to cause, when executed by a processor in a data processing system, the data processing system to produce a program output, the method comprising:
   parsing the computer program code as to identify at least one conditional program statement, the conditional program statement including a condition and a plurality of alternative program statements, the conditional program statement being adapted to cause a data processing system to evaluate said condition and, responsive to a result of said evaluating step, to selectively execute one of said plurality of alternative program statements;
   wherein the plurality of alternative program statements are adapted to cause the computer program code to produce the same program output irrespective of which of said alternative program statements is executed;
   extracting at least a part of said embedded information from the condition;
   wherein said information is encoded as one or more code words, each code word corresponding to one or more predetermined conditions; and
   wherein a digital watermark is embedded in said condition, such that the watermark is directly read from the computer program code by a machine, without executing the code.

13. The method according to claim 12, wherein said information comprises the digital watermark.

14. The method according to claim 12, wherein the computer program code comprises at least one of source code and object code.

15. The method according to claim 12, further comprising loading the computer program code into a memory of a computer.

16. A data processing system comprising a memory and a processor, the processor suitably configured to perform the steps of the method according to claim 12.

17. A tangible and non-transitory computer program product comprising computer-executable instructions adapted to cause, when executed on a data processing system, the data processing system to perform the method according to claim 12.

18. A computer program product according to claim 17, comprising a computer-readable medium having stored thereon the computer-executable instructions.

19. A tangible and non-transitory computer program product comprising a software compiler having functionality adapted to cause a data processing system to perform the method according to claim 12 as one of a number of compilation passes performed by the compiler.

* * * * *